US008583284B2

(12) United States Patent
Eidenberger et al.

(10) Patent No.: US 8,583,284 B2
(45) Date of Patent: Nov. 12, 2013

(54) DECISION MAKING MECHANISM, METHOD, MODULE, AND ROBOT CONFIGURED TO DECIDE ON AT LEAST ONE PROSPECTIVE ACTION OF THE ROBOT

(75) Inventors: Robert Eidenberger, Lichtenberg (AT); Thilo Grundmann, München (DE); Raoul Daniel Zöllner, München (DE)

(73) Assignee: Siemens Aktiengesellschaft, Munich (DE)

( * ) Notice: Subject to any disclaimer, the term of this patent is extended or adjusted under 35 U.S.C. 154(b) by 642 days.

(21) Appl. No.: 12/753,560

(22) Filed: Apr. 2, 2010

(65) Prior Publication Data

US 2010/0262286 A1    Oct. 14, 2010

(30) Foreign Application Priority Data

Apr. 3, 2009 (EP) .................................. 09004982
Sep. 11, 2009 (EP) .................................. 09011666

(51) Int. Cl.
*G05B 19/04* (2006.01)
(52) U.S. Cl.
USPC ........... 700/246; 700/245; 700/253; 700/255; 700/261; 700/262; 700/263
(58) Field of Classification Search
USPC ......... 700/245, 246, 261, 253, 255, 262, 263; 901/50, 9, 30, 2, 8
See application file for complete search history.

(56) References Cited

U.S. PATENT DOCUMENTS 5,179,441 A * 1/1993 Anderson et al. ................ 348/43
2006/0282021 A1 * 12/2006 DeVaul et al. ................ 600/595
2008/0162088 A1 * 7/2008 DeVaul et al. ................ 702/190
2010/0092032 A1 * 4/2010 Boca ............................. 382/103
2010/0138366 A1 * 6/2010 Zhang ............................ 706/12

OTHER PUBLICATIONS

Matthijs T.J. Spaan ("Cooperative Active Perception using POMDP's" Institute for System and Robotic, Lisbon, Portugal; 2008 Workshop in Advancements in POMDP, pp. 49-54).*
Eidenberger et al. "Fast Parametric Viewpoint Estimation for Active Object Detection," in Proceedings of the IEEE International Conference on Multisensor Fusion and Integration for Intelligent Systems, 2008 (6 pages).
Chli et al. "Active Matching," in European Conference on Computer Vision, 2008 (14 pages).

(Continued)

*Primary Examiner* — Khoi Tran
*Assistant Examiner* — Jorge Peche
(74) *Attorney, Agent, or Firm* — King Spalding L.L.P.

(57) ABSTRACT

A decision mechanism is configured to decide on at least one prospective action of a robot from set of actions by: computing a prior probabilistic representation of a prior environment state; updating the prior probabilistic representation with targets of a new observation on reducing at least one uncertainty in a posterior probabilistic representation of a posterior environment state to be reached after an appliance of the at least one prospective action, the posterior probabilistic representation resulting from the updating; determining an information gain between the prior probabilistic representation and the posterior probabilistic representation by use of at least one information theoretic measure; evaluating the at least one prospective action by adding costs of executing the at least one prospective action to the information gain. Furthermore, an improved action planning for robots is provided and can be implemented in various robots investigating scenes for their actions.

26 Claims, 12 Drawing Sheets

(56) References Cited

OTHER PUBLICATIONS

Vogel et al. "Target-Directed Attention: Sequential Decision-Making for Gaze Planning," in International Conference on Robotics and Automation 2008 (8 pages).

Duff "Optimal Learning: Computational Procedures for Bayes-Adaptive Markov Decision Processes," Ph.D. Dissertation, Massachusetts Amherst, 2002 (266 pages), Feb. 1, 2002.

Roy et al. "Finding Approximate POMDP Solutions Through Belief Compression," Journal of Artificial Intelligence Research vol. 23 pp. 1-40, 2005 Book (40 pages), Jan. 1, 2005.

Porta et al. "Robot Planning in Partially Observable Continuous Domains," Robotics: Science and Systems p. 217224, 2005 (8 pages).

Porta et al. "Point-Based Value Iteration for Continuous POMDPs," Journal of Machine Learning Research vol. 7 pp. 2328-2367 (40 pages), Nov. 1, 2006.

Ross et al. "Online Planning Algorithms for POMDPs," Journal of Artificial Intelligence Research, vol. 32, pp. 663-704, 2008 (42 pages).

Paquet et al. "Hybrid POMDP Algorithms," in Workshop on Multi-Agent Sequential Decision Making in Uncertain Domains, 2006, pp. 133-147 (16 pages).

Yoon et al. "Probabilistic Planning via Determinization in Hindsight," in AAAI Conference on Artificial Intelligence, 2008 (8 pages).

Guo et al. "Decision-Theoretic Active Sensing for Autonomous Agents," in Proceedings of the $2^{nd}$ International Joint Conference on Autonomous Agents and Multi-Agent Systems, 2003 (6 pages).

Ji et al. "Cost-Sensitive Feature Acquisition and Classification," Patter Recognition, vol. 40, pp. 1474-1485 (24 pages), Mar. 2, 2006.

Spaan "Cooperative Active Perception Using POMDPs," in AAAI 2008 Workshop on Advancements in POMDP Solvers (6 pages), 2008.

Lowe, "Object Recognition from Local Scale-Invariant Features," in International Conference on Computer Vision, 1999 pp. 1150-1157 (8 pages), Sep. 1, 1999.

European Search Report, European Applicaiton No. 09011666.6-1225, 7 pages, Sep. 17, 2010.

Spaan, Matthijs; "Cooperative Active Perception using POMDP's", Institute for Systems and Robotics, Lisbon, Portugal; 2008 Workshops in Advancements in POMDP, pp. 49-54, Jul. 17, 2008.

Fox, Deiter, et al.; "Bayesian Filtering for Location Estimation", Pervasive Computing, IEEE Pervasive Computing, IEEE vol. 2, No. 3; pp. 24-33, Sep. 30, 2003.

Miura, Jun, "Environment Recognition and Action Planning for Mobile Robots", Journal of the Robotics Society of Japan, The Robotics Society of Japan, vol. 26, issue 4; pp. 322-325, May 15, 2008.

Japanese Office Action, Japan Patent No. 2010-87108, 8 pages, Feb. 10, 2012.

\* cited by examiner

FIG 8

| View-points (81) | VP1 $V_1$ (82) | costs (83) | VP1 value (84) | $V_1$ (85) | costs (86) | VP2 value (87) | $V_1$ (88) |
|---|---|---|---|---|---|---|---|
| VP1 | -0.00 | x | x | x | -0.25 | -0.61 | -0.86 |
| VP2 | -0.25 | -0.25 | -0.30 | -0.55 | x | x | x |
| VP3 | -0.50 | -0.50 | -1.00 | -1.50 | -0.25 | -0.58 | -0.83 |
| VP4 | -0.75 | -0.75 | -0.66 | -1.41 | -0.50 | -0.32 | -0.82 |
| VP5 | -1.00 | -1.00 | -0.79 | -1.79 | -0.75 | -0.72 | -1.47 |
| VP6 | -0.75 | -0.75 | -0.79 | -1.54 | -1.00 | -0.77 | -1.77 |
| VP7 | -0.50 | -0.50 | -0.50 | -1.00 | -0.75 | -0.27 | -1.02 |
| VP8 | -0.25 | -0.25 | -0.71 | -0.96 | -0.50 | -1.00 | -1.50 |

FIG 9

| $\alpha_n =$ (91) | occlusion detection (92) | no occlusion consideration (93) |
|---|---|---|
| $\alpha$ | VP1 → VP2 → VP4 | VP1 → VP2 → VP1 → VP2 |
| $0.5\alpha$ | VP1 → VP2 → VP7 | VP1 → VP2 → VP1 → VP2 |
| $2\alpha$ | VP1 → VP2 → VP3 → VP4 | VP1 → VP2 → VP1 → VP2 |

DECISION MAKING MECHANISM, METHOD, MODULE, AND ROBOT CONFIGURED TO DECIDE ON AT LEAST ONE PROSPECTIVE ACTION OF THE ROBOT

CROSS-REFERENCE TO RELATED APPLICATIONS

This application claims priority to EP Patent Application No. 09004982 filed Apr. 3, 2009 and EP Patent Application No. 09011666 filed Sep. 11, 2009, the contents of which is incorporated herein by reference in its entirety.

TECHNICAL FIELD

The present invention refers to deciding on at least one prospective action of a robot from a set of actions of said robot. In particular, the present invention relates to a decision making mechanism or component configured to perform said deciding, a method configured to perform said deciding, an active perception module implementing and performing said deciding, and a robot implementing and performing said deciding.

BACKGROUND

The demand of suitability of robots for everyday environments requires that the robots are capable to localize objects under challenging environmental conditions such as bad lighting, reflections, or occlusions, for example. Since object classification and localization goals often cannot be achieved from single measurements, active strategies are required to overcome these problems and enable an autonomous approach to scene recognition by robots.

The knowledge of objects available in a scene or in an environment of a robot is often an important precondition for the robot to be able to perform further tasks or actions, e.g., grasping of objects or further acting with regard to the objects.

Most of current active vision systems focus on information theoretic quality measures for next best view planning but do not follow probabilistic planning strategies. In literature many approaches to active perception exist. In [1], some works are listed which mainly focus on action selection based on uncertainty reduction. A more recent work [2] deals with active feature matching for 3D camera tracking. In [3] a greedy approach to visual search is presented. It focuses on gaze planning for object detection including context information based on prior knowledge.

A partially observable Markov decision process (POMDP) is a general model for planning under uncertainty. POMDPs statistically reason over costs for control actions for finding an optimal action policy. In various embodiments, continuous stochastic domains are considered. Therefore, when considering the state of art in following, it is focused mainly on known works which deal with continuous state spaces.

In [4], continuous domains are approximated by grids. For the resulting discrete problem, the computational complexity increases strongly in high dimensional state spaces. Here, a coarser sampling, however, would reduce the complexity at the costs of lower accuracy.

Some of known approaches consider continuous domains directly. In various known works, see [5], [6], for example, all possible situations are evaluated in an off-line process. Hence, the best action to execute is initially specified. In Porta [7], these ideas are extended by applying it on continuous action spaces and observations. However, all these known approaches or works are restricted to small domains in order to keep the extensive pre-processing required feasible. As in many applications, action values largely depend on the situation, they cannot be determined prior to execution. An overview on online planning algorithms or methods for POMDPs is given in [8]. Most of the known works follow real-time constraints by improving rough off-line policies with the outcome of online strategies. Therefore, methods such as branch and bound pruning, Monte-Carlo sampling or heuristic searches are required. However, such methods limit the number of reachable and relevant states (see [9], for example). In [10], a deterministic forward heuristic search algorithm or method is used for probabilistic planning. Most of the known look-ahead search methods reduce the complexity either by optimizing the action or observation space or by orienting the search towards the most relevant actions and observations.

Known approaches, which are closer related to active sensing, use POMDPs for evaluating sensing costs in order to find the most promising actions. In Guo [11], for example, a framework for optimal decision-making with respect to classification goals is proposed. Here, the ideas are applied to rock classification with an autonomous rover. The costs for acquiring additional information are balanced against penalties for misclassification. In [12], a POMDP is used for cost-sensitive feature acquisition and classification. The expected reward of a selected action for a robot is calculated from the classification costs with respect to the current belief state. Spaan [13], in turn, suggests extending the planning strategy by combining costs with payoffs coming from information theoretic uncertainty measurements.

SUMMARY

According to various embodiments, an improved methodology for autonomously investigating of scenes by robots can be provided.

According to an embodiment, a decision making mechanism can be configured to decide on at least one prospective action of a robot from a set of actions of the robot by:—computing a prior probabilistic representation of a prior environment state;—updating of the prior probabilistic representation with targets of a new observation on reducing at least one uncertainty in a posterior probabilistic representation of a posterior environment state to be reached after an appliance of the at least one prospective action, wherein the posterior probabilistic representation is a probabilistic representation resulting from the updating;—determining an information gain between the prior probabilistic representation and the posterior probabilistic representation by use of at least one information theoretic measure; and—evaluating the at least one prospective action by adding costs of executing the at least one prospective action to the information gain.

According to a further embodiment, the at least one prospective action can be an action to be executed by the robot. According to a further embodiment, the at least one prospective action can be a robot actuation command demanding a change of position of a sensor of the robot. According to a further embodiment, the decision making mechanism is configured to evaluate a sequence of prospective actions of the robot. According to a further embodiment, the at least one uncertainty comprises:—a state transition uncertainty arising when reaching the posterior environment state from the prior environment state by the appliance of the at least one prospective action; and/or—a measurement noise disturbing a measurement performed at the posterior environment state. According to a further embodiment, the decision making mechanism can be configured to perform the updating in a Bayes filter. According to a further embodiment, the at least one information theoretic measure can be entropy on a probabilistic representation. According to a further embodiment, the determining may comprise determining of a difference between a prior entropy of the prior probabilistic representation and a expected entropy of the posterior probabilistic representation. According to a further embodiment, the updating may comprise an estimating of the new observation, which will be obtained after executing of the at least one prospective action. According to a further embodiment, the updating may comprise predicting of the posterior probabilistic representation of the posterior environment state for the at least one prospective action by use of the estimating. According to a further embodiment, of the prior probabilistic representation and the posterior probabilistic representation can be multivariate Gaussian mixture distributions. According to a further embodiment, the at least one uncertainty can be a state uncertainty determined by approximating differential entropy of the posterior probabilistic representation by an upper-bound estimate. According to a further embodiment, the decision making mechanism can be configured to decide on the at least one prospective action if, after executing of the at least one prospective action, the information gain is maximized and the costs of executing the at least one prospective action and the uncertainty are reduced. According to a further embodiment, the decision making mechanism can be configured to terminate the deciding if a desired quality criteria is reached. According to a further embodiment, the desired quality criteria may be provided in form of at least one distribution entropy. According to a further embodiment, the prior probabilistic representation and the posterior probabilistic representation are computed by use of a model specified by use of a POMDP concept. According to a further embodiment, the prior environment state and the posterior environment state may describe a state of at least one object, wherein the state of at least one object contains a discrete class representation of a class of the at least one object and a continuous m-dimensional pose of the at least one object. According to a further embodiment, the prior environment state and the posterior environment state may refer to a state of a scene comprising at least one object located in the scene and determine visibility of features the at least one object in the state. According to a further embodiment, the new observation may be expressed as a detection of a set of features of at least one object of a scene. According to a further embodiment, the decision making mechanism may be implemented in the robot. According to a further embodiment, the decision making mechanism may be implemented in an active perception module of the robot, the active perception module being configured to autonomously investigate scenes.

According to yet another embodiment, a method can be configured to decide on at least one prospective action of a robot from a set of actions of the robot by:—computing a prior probabilistic representation of a prior environment state;—updating of the prior probabilistic representation with targets of a new observation on reducing at least one uncertainty in a posterior probabilistic representation of a posterior environment state to be reached after an appliance of the at least one prospective action, wherein the posterior probabilistic representation is a probabilistic representation resulting from the updating;—determining an information gain between the prior probabilistic representation and the posterior probabilistic representation by use of at least one information theoretic measure; and—evaluating the at least one prospective action by adding costs of executing the at least one prospective action to the information gain.

According to yet another embodiment, an active perception module may be configured to autonomously investigate scenes and comprise a decision making mechanism as described above.

According to a further embodiment of the active perception module, the active perception module can be implemented in a robot.

According to yet another embodiment, a robot may be configured to autonomously investigate scenes and may comprise one of the following:—a decision making mechanism as described above; or—an active perception module as described above.

BRIEF DESCRIPTION OF THE DRAWINGS

The present invention will be more clearly understood from the following description of various embodiments read in conjunction with the attached drawings, in which:

FIGS. 4-8 show results of an experiment performed according to an embodiment; and FIG. 9 shows results of a further experiment performed according to a further embodiment.

DETAILED DESCRIPTION

Figure 1:
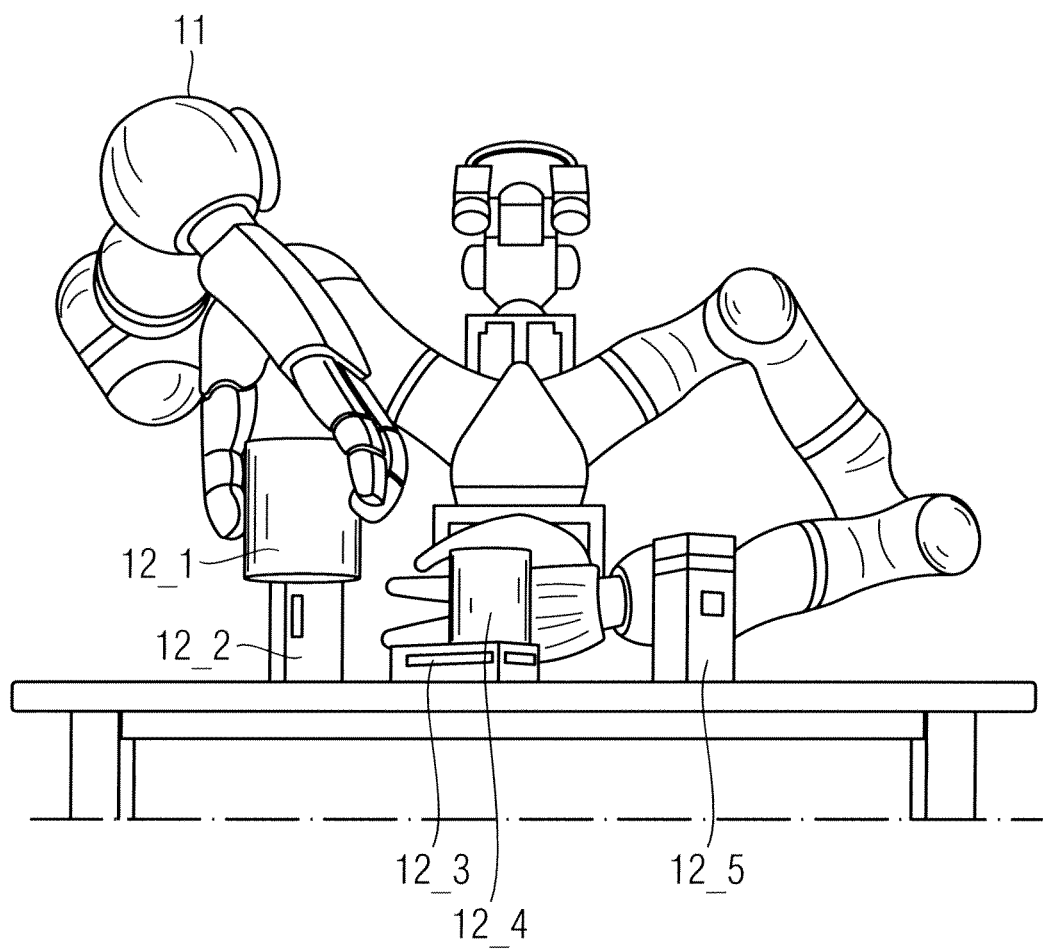
FIG. 1 shows a service robot operating in a multi-object scenario, where a detected and located object (here, a sauerkraut can) is grasped by the robot after a successful scene recognition by the robot, wherein the service robot can be configured or arranged according to various embodiments.

According to various embodiments, a decision making mechanism can be configured to decide on at least one prospective action of a robot from a set of actions of said robot by:

computing a prior probabilistic representation of a prior environment state;

updating of said prior probabilistic representation with targets of a new observation (or measure) on reducing at least one uncertainty in a posterior probabilistic representation of a posterior environment state to be reached after an appliance of said at least one prospective action, wherein said posterior probabilistic representation is a probabilistic representation resulting from said updating;

determining an information gain between said prior probabilistic representation and said posterior probabilistic representation by use of at least one information theoretic measure; and evaluating said at least one prospective action by adding costs of executing said at least one prospective action to said information gain.

In this way, an active strategy for an autonomous approach to scene recognition by robots is provided or enabled. According to various embodiments, a sequence of observations or measurements is fused such that sensing results at costs of extra activity are improved. According to various embodiments, a planning strategy can be provided, which contrasts the expected benefits of a further measurement with the implied sensing and action costs. Further, methodology provided by the various embodiments considers also uncertainties resulting from inaccurate sensing processes and from the system dynamics in real continuous domains, which have to cope with. Thus, the various embodiments are capable of localizing objects under challenging environmental conditions such as bad lighting, reflections, or occlusions, for example. Here, according to various embodiments, the prospective actions can be directed to an autonomous investigation and/or recognition of scenes, objects, and/or environments.

The various embodiments provide a methodology for fast and efficient planning of actions in high dimensional state spaces by comparing several criteria of quality by considering or taking into account several uncertainties of estimations.

The deciding on at least one prospective action can be performed by at least one accordingly configured or arranged entity or module comprised in the decision making mechanism. As explained below, according to an embodiment said computing of a prior probabilistic representation and said updating are performed by a state estimation entity or module, and said determining and said evaluating are performed by a (control) policy entity or module comprised in the decision making mechanism.

Here, it has to be noted, that this allows a configuration or arrangement of several entities and/or modules in the decision making mechanism for said deciding on at least one prospective action of a robot from a set of actions of said robot, wherein the several entities and/or modules are configured to perform the actions of the decision making mechanism according to various embodiments. The present invention is not restricted to a specific configuration and/or arrangement of such entities and/or modules. Further, the entities and/or modules can be, for example, hard- and/or software entities and/or modules.

According to an embodiment, said at least one prospective action is an action to be executed by said robot.

According to a further embodiment, said at least one prospective action is a robot actuation command demanding a change of position of a sensor of said robot. Thus, this allows investigating of scenes by the robot by deciding on actions, which enable the investigating from several positions and with regard to several viewpoints.

According to an embodiment, said decision making mechanism is configured to evaluate a sequence of prospective actions of said robot. In this way, a comprehensive planning of prospective of future actions to be performed by the robot is enabled.

According to an embodiment, said at least one uncertainty comprises:
  a state transition uncertainty arising when reaching said posterior environment state from the prior environment state by said appliance of said at least one prospective action; and/or
  a measurement noise disturbing a measurement performed at said posterior environment state.

Thus, several uncertainties with regard to actions performed by a robot can be taken into account by the various embodiments.

According to an embodiment, said decision making mechanism is configured to perform said updating in a Bayes filter.

According to an embodiment, said at least one information theoretic measure is entropy on a probabilistic representation. Entropy is an information theoretical concept and is applied particularly in cases when a system, situation, or scene is given whose exact description is not precisely known. The entropy is defined as the expected amount of information needed to exactly specify the state of the system, situation, or scene, given what we know about the system, situation, or scene. In general, entropy represents a measure of the amount of information that is missing (at a certain state). Thus, by use of entropy as information theoretic measure, a way of specifying features, which should be taken into account by the robot and which are not known or not known in detail as yet, is provided.

According to an embodiment, said determining comprises determining of a difference between a prior entropy of said prior probabilistic representation and an expected entropy of said posterior probabilistic representation.

According to an embodiment, said updating comprises an estimating of the new observation or measure, which will be obtained after executing of said at least one prospective action. Thus, this allows taking into account or considering of possible effects of an action when deciding on the action.

According to an embodiment, said updating comprises predicting of said posterior probabilistic representation of said posterior environment state for said at least one prospective action by use of said estimating.

According to an embodiment, said prior probabilistic representation and said posterior probabilistic representation are multivariate Gaussian mixture distributions. In this way, this allows considering of various hypotheses within the same probability distribution.

According to an embodiment, said at least one uncertainty is a state uncertainty determined by approximating a differential entropy of said posterior probabilistic representation by an upper-bound estimate. Here, according to an embodiment, said posterior probabilistic representation can be said multivariate Gaussian mixture distribution.

According to an embodiment, said decision making mechanism is configured to decide on said at least one prospective action if, after executing of said at least one prospective action, said information gain is maximized and said costs of executing said at least one prospective action and said uncertainty are reduced.

Thus, the methodology provided by the various embodiments follows in general a concept of contrasting the information gain gathered from a new measurement and control action costs.

According to an embodiment, the decision making mechanism is configured to terminate said deciding, if a desired quality criteria is reached. The desired quality criteria can be a preset or predetermined quality criteria. Thus, a flexible deciding on actions by providing the degree of quality required in a certain situation is allowed.

According to an embodiment, said desired quality criteria is provided in form of at least one distribution entropy. Thus, the degree of quality required can be defined by a measure specifying an allowable and/or acceptable amount of information that is missing.

According to an embodiment, said prior probabilistic representation and said posterior probabilistic representation are computed by use of a model specified by use of a POMDP concept. Thus a solution is proposed for finding optimal action policies for successful object detection by a statistical framework for state estimation in form of a partially observable Markov decision process (POMDP).

According to an embodiment, said prior environment state and said posterior environment state describe a state of at least one object, wherein said state of at least one object contains a discrete class representation of a class of said at least one object and a continuous m-dimensional pose of said at least one object. Thus, a state model as required according to the POMDP concept is provided. By use of the state model, a comprehensive considering of the states of the at least one object is performed. In particular, this considering is done by use of the probabilistic representations of environment states, the uncertainties, and/or information theoretic measures.

According to an embodiment, said prior environment state and said posterior environment state refer to a state of a scene comprising at least one object located in said scene and determine visibility of features said at least one object in said state. In this way, a scene model can be provided. By use of the state model, a comprehensive considering of scenes can be performed. In particular, this considering is done by use of the probabilistic representations of environment states, the uncertainties, and/or information theoretic measures.

According to an embodiment, said new observation is expressed as a detection of a set of features of at least one object of a scene. Thus, an observation model as required according to the POMDP concept is provided. In particular, this observation model is taken into account or considered by use of the probabilistic representations of environment states, the uncertainties, and/or information theoretic measures.

According to an embodiment, said decision making mechanism is implemented in said robot.

According to an embodiment, said decision making mechanism is implemented in an active perception module of said robot, said active perception module being configured to autonomously investigate scenes.

According to other embodiments, a method can be configured to decide on at least one prospective action of a robot from a set of actions of said robot by:
  computing a prior probabilistic representation of a prior environment state;
  updating of said prior probabilistic representation with targets of a new observation (or measure) on reducing at least one uncertainty in a posterior probabilistic representation of a posterior environment state to be reached after an appliance of said at least one prospective action, wherein said posterior probabilistic representation is a probabilistic representation resulting from said updating;
  determining an information gain between said prior probabilistic representation and said posterior probabilistic representation by use of at least one information theoretic measure; and
  evaluating said at least one prospective action by adding costs of executing said at least one prospective action to said information gain.

According to an embodiment, the method is performed by the decision making mechanism as sketched above and described in more detail below. In particular, the method is configured to perform the actions of the decision making mechanism as steps or activities of the method.

According to yet other embodiments, a computer program product may comprise a code, the code being configured to implement and/or perform the above mentioned method.

According to an embodiment, the code is embodied on a data carrier. According to a further embodiment, the computer program product is configured to perform said method when the computer program product is executed by a processing unit like a processor, for example.

According to yet another embodiment, a data carrier may comprise said computer program product.

According to yet another embodiment, an active perception module may be configured to autonomously investigate scenes and comprises the decision making mechanism as sketched above and described in more detail below.

According to an embodiment, said active perception module is implemented in a robot.

According to yet another embodiment, a robot can be configured to autonomously investigate scenes and comprises one of the following:
  the decision making mechanism as sketched above and described in more detail below; or
  the active perception module as sketched above and described in more detail below.

Thus, various embodiments provide an improved methodology for autonomously investigating of scenes by robots. In particular, various embodiments allow deciding on actions required for the autonomously investigating of scenes and/or supporting the autonomously investigating of scenes in a fast and efficient way.

Further, by use of various embodiments the disadvantages or drawbacks of the known methods as exemplary explained above can be overcome.

In general, various embodiments refer to service robots which are configured or arranged to autonomously investigate scenes and to perform manipulation tasks such as grasping objects, for example. In FIG. 1, an exemplary robot 1 operating in a complex scenario is shown. The robot of FIG. 1 is investigating a scene with several objects 12_1, 12_2, 12_3, 12_4, 12_5 placed on the table and is grasping the objects or at least one of the objects 12_1 after the investigation of the scene and after perception or recognition of the objects 12_1, 12_2, 12_3, 12_4, 12_5.

The service robot 1 can be configured or arranged to decide on actions by use of various embodiments. In particular, it is decided on actions to be performed by the robot 1. Thereby, the actions can be directed to the autonomously investigating of scenes by the robot. I.e., the robot uses these actions to perform a better and/or complete investigation of a scene (here a table) with several objects 12_1, 12_2, 12_3, 12_4, 12_5

In following, at first, a basic probabilistic framework as used according to an embodiment is introduced. The subsequent description of the basic probabilistic framework provides in particular an overview over the state estimation process, applied according to the embodiment, in connection with the POMDP concept, also utilized according to the embodiment.

Figure 2:
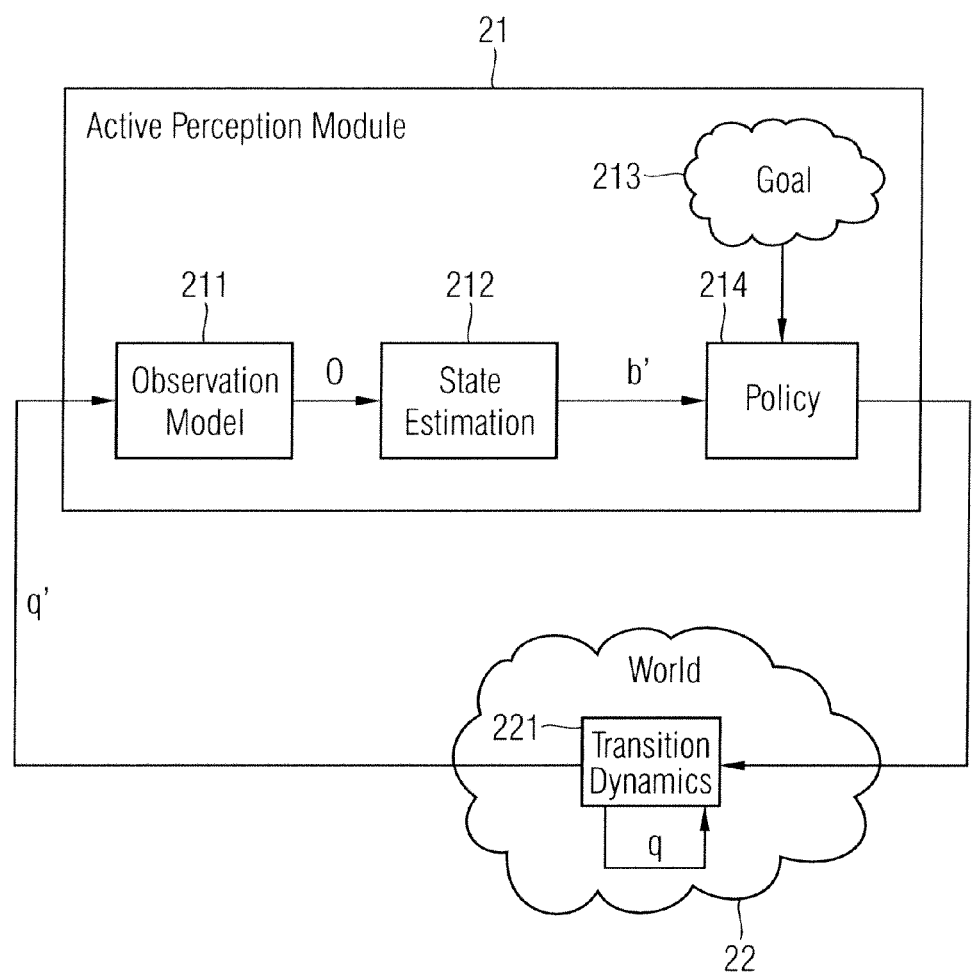
FIG. 2 shows an active perception or recognition framework utilized according to an embodiment.

FIG. 2 shows a schematic illustration of an active perception or recognition framework utilized according to the embodiment. In particular, FIG. 2 shows a basic concept of the proposed probabilistic framework according to the embodiment.

On one side, an active perception module 21 is provided according to the present embodiment. In the active perception module 21, actions for further investigation or recognizing of a scene are chosen and where the investigation or recognizing of a scene is performed. On the other side, the real world 22 concerning the environment or the robot and/or the scene with at least one object is shown in FIG. 2 according to the present embodiment. At the real world side 22, transitions and dynamics 221 are performed by the robot. In particular the transitions and dynamics 221 occur due to performance of an action 'a' chosen in the active perception module 21 and performed by the robot. The box 221 of FIG. 2 represents the performing of the chosen action 'a' by the robot. The performing of the chosen action 'a' causes a change from a current or prior state q to a new or posterior state q'.

In an active perception situation, according to the embodiment, it is aimed in the active perception module 21 on choosing control actions a∈A of robot to reach a specific goal 213 (e.g. to investigate or recognize a given situation).

There, a wide range of different actions a∈A is given, which largely depend on the application, like sensor parameter selection such as zooming or robot actuation, for example. Decision making bases according to the present embodiment on the costs of the executed action and the reward from the expected belief b(q), which denotes the conditional probability distribution over the state q. State estimation 212 determines this belief distribution by updating the initial distribution by incorporating an observation O. In order to find an optimal action policy π a sequence of prospective actions and observations has to be evaluated by a decision mechanism or component (e.g. placed in the active perception module 21 of FIG. 2).

In observation model entity 211 of FIG. 2, real observations or measures O of the robot are managed. Here, an observation or measure O is described by use of valuating uncertainties of the observation or measure O. An observation O represents according to the present embodiment a probability distribution with regard to objects involved in the scene; a set of determined or recognized features of the objects; and/or estimates of the position of an object for each of the objects of the scene. An uncertainty represents a value of failure of the observation or measure O, i.e. a value for possible deviation of the observation or measure O of the robot from the actual situation.

Then, the information concerning the observation or measure O of the robot is provided to the state estimation entity 212 where the current knowledge of the robot of the scene to be recognized or investigated is updated by use of the observation O. Then, a new knowledge b' is provided to a policy entity 214. The policy entity 214 uses then the knowledge b' an by keeping in mind the goal 213 decides on a new action 'a', which has to be performed by the robot to perform a further investigation or recognition of the scene.

In following, when explaining the active perception or recognition framework utilized according to the present embodiment, the Bayesian statistical framework for state estimation and the use of partially observable Markov decision processes for active planning under uncertainty are depicted in detail.

For state estimation 212, a Bayesian state estimator is used according to the present embodiment. System properties for dynamic environment follow according to the present embodiment the following equations:

$$q' = g(a_p, q) + \epsilon_t \quad (1)$$

$$O_t = h(q') + \sigma_t \quad (2)$$

To clarify the notation, the index t denotes a time step. This time step t covers the period of incorporating one action observation pair into the state update. Often the robot system state q cannot be addressed right after the control action 'a' but only after the measurement. Thus the apostrophe ' denotes the state transition due to action effects.

Equations (1) and (2) are used in the observation model 211 to describe the observation and current knowledge and/or assumptions of the robot with regard to the situation to be investigated and recognized by the robot.

Equation (1) describes that reaching a future or posterior state q' depends on the previous state q and on the applied action $a_t$. The system dynamics underlay the state transition uncertainty $\epsilon_t$. When interpreting single observations, often object classes and object states have to be suggested or recognized from insufficient measurement data. These uncertainties might result, e.g., from inaccurate sensing devices, weak classifiers, occlusions, poor lighting, ambiguity of object models etc.

According to the present embodiment, the probability distribution over the state:

$$b_{t-1}(q) = p(q|O_{t-1}(a_{t-1}), \ldots, O_0(a_0)) \quad (3)$$

is considered as the a priori belief for previous sensor measurements or observations $O_{t-1}(a_{t-1}), \ldots, O_0(a_t)$. Applying an action 'a' with its state transition probability $p_a(q'|q)$ containing $\epsilon_t$ leads to a probabilistic model for prediction update in state estimation entity 212 according to the present embodiment:

$$p_a(q'|O_{t-1}(a_{t-1}), \ldots, O_0(a_0)) = \int_q b_{t-1}(q) p_a(q'|q) dq. \quad (4)$$

Equation (2) depicts the measurement or observation $O_t$ at time step t, which is performed at the current system state q' and is disturbed by measurement noise $\delta_t$. Given this equation the measurement update model is formulated in Bayesian context as $P(O_t(a_t)|q')$.

From combining both models using Bayes' rule equation (5) for calculating the updated state distribution $b_t^{O_t(a_t)}(q')$ is derived:

$$b_t^{O_t(a_t)}(q') = p(q' | O_t(a_t), \ldots, O_0(a_0)) \quad (5)$$

$$= \frac{P(O_t(a_t) | q') p_a(q' | O_t(a_t), \ldots, O_0(a_0))}{P(O_t(a_t), \ldots, O_0(a_0))}.$$

The evidence term $P(O_t(a_t), \ldots, O_0(a_0))$ is determined by integrating over the state distribution applying the theorem of total probability:

$$P(O_t(a_t), \ldots, O_0(a_0)) = \int_q P(O_t(a_t)|q') p_a(q'|O_{t-1}(a_{t-1}), \ldots, O_0(a_0)) dq'. \quad (6)$$

In sequential decision making 214 according to the present embodiment, in order to realize a reasonable behaviour, the selection of actions 'a' needs to follow stochastic methods for optimal control. The objective lies in maximizing the long term reward of all executed actions and the active reduction of uncertainty in the belief distribution. As stated, according to the embodiment, a continuous POMDP for solving planning problems is used. The following characteristics of the POMDP are specified with regard to various embodiments.

1) The problem of sequential decision making under uncertainty is formulated as a POMDP. The MOMDP can be described as a tuple (S, A, T, R, Ω, Z). Here, S denotes the set of all environment states, A contains all actions and T: S×A×S→[0,1] represents the state-transition function with its transition probabilities T(q, a, q')=$p_a(q'|q)$. Ω denotes the set of all possible observations and Z denotes the observation function Z: S×A×Ω→[0,1] where $P_{(O_t(a_t)|q')}$ is the measurement probability. The reward function R: S×A→R specifies the immediate reward $R_a(q)$ which is obtained from executing action a in state q.

In order to find the best action sequence which is specified by the maximum total reward, value iteration algorithms or methods are used according to the present embodiment for optimally solving POMDPs. Applying the Bellman equation to a reinforcement learning problem leads according to the present embodiment to the recursive formulation:

$$V_t(b) = \max_a R_a(b) + \gamma \int V_{t-1}(b') p_a(b' | b) dq' \quad (8)$$

with $V_1(b) = \max_a R_a(b)$. This can be interpreted as the expected future reward which will be gathered after iterating t actions and observations. b' is an abbreviation for b(q'), γ denotes the discount rate which penalizes later actions and consequently assigns more weight to initial actions. To avoid integrating over the belief space this equation is transformed by use of equation (5) to:

$$V_t(b) = \max_a R_a(b) + \gamma \int V_{t-1}(b^{O_t(a_t)}) P(O_t(a_t) \mid q) dO_t. \quad (8)$$

The control policy:

$$\pi(b) = \mathrm{argmax}_a R_a(b) + \gamma \int V_{t-1}(b^{O_t(a_t)}) P(O_t(a_t) \mid q) dO_t \quad (9)$$

maps the probability distribution over the states to actions. Assuming a discrete observation space the integral can be replaced by a sum.

2) When performing value estimation, in most known works, the reward $R_a(b)$ for an action 'a' is specified either by an initial value function or learnt in a hybrid approach by combining off-line and online models.

In large domains, the off-line computation of the value function in equation (8) is too costly. According to the present embodiment, the high dimensional state, action and observation spaces are scaled down to enable a fast determination of relevant rewards.

In following, after the introduction of the basic concept of the probabilistic framework proposed according to the present embodiment, an implementation of the active perception framework according to an embodiment is considered in more detail.

In particular, in following, the basic concept as explained above is applied on a robotic scenario. Here, besides the used model, the parametric probabilistic representation and the applied control policies are discussed.

At first, a model specification (corresponding the observation model 211 of FIG. 2) is provided with regard to the robotic scenario according to the present embodiment. The model specification can be divided into four sub models of four sub specifications according to the present embodiment:

1) State model: A set of object models ($C_1, \ldots, C_c$) establishes an object database C, containing all c different object classes, which are to be detected by a robot. The tupel $q=(C_i,\phi^T)^T$ describes the object state, containing its discrete class representation and its continuous m-dimensional pose $\phi=(\phi_1, \ldots, \phi_m)T$ with $\phi \in R^m$.

2) Action model: There are several different types of control actions 'a'. In the active perception scenario provided according to the present embodiment viewpoint changes only are considered as relevant. Thus, according to the present embodiment, 'a' is a set of robot actuation commands demanding the change of the sensor position.

3) Scene model: According to the present embodiment, the scene model comprises the actual state of all located objects. Here, the emerging occlusion problem is covered by a point-based method of computer graphics to determine the feature visibility. According to the present embodiment, each peak in the belief distribution of the state is considered to be an object hypothesis. All expected features are checked against all hypotheses' bounding boxes for occlusions by applying the wide-spread z-buffering algorithm. When detecting an occlusion the Gaussian mixture component of the hypothesis, which the feature belongs to, is not updated in the prospective measurement update step. However, the state transition is applied according to the present embodiment.

4) Observation model: For using interest point detectors a current observation $O_t(a_t)$ is expressed according to the present embodiment as a detection of a set of N features 'f':

$$O_t(a_t) = \{f_1(a_t), \ldots, f_N(a_t)\}. \quad (10)$$

For a large number of features, a substituting $O_t(a_t)$ in the likelihood distribution $P(O_t(a_t)|q')$ with equation (10) can be computationally expensive. According to the present embodiment, all features are assumed to be conditionally independent, so that the likelihood distribution can be computed according to the present embodiment by applying the naive Bayes assumption:

$$P(O_t(a_t) \mid q') = \prod_i^N P(f_i(a_t) \mid q'). \quad (11)$$

As regards the probabilistic representation according to the present embodiment, for the representation of the world state, all single peaked densities are inappropriate because of the purpose to model various object hypotheses and multiple objects within the same probability distribution. Thus, alternatives like particle distributions and mixtures of Gaussian are used as the feasible according to the present embodiment. In particular, according to the present embodiment multivariate Gaussian mixture distributions are used, which are suitable to high dimensional state spaces. Equation (19) depicts it as the weighted sum over normal distributions, given by their mean vectors $\mu_k$ and covariance matrices $\Sigma_k$. $w_k$ denotes the weight of the k-th component.

$$p(q) = \sum_{k=1}^{K} w_k N(q \mid \mu_k, \Sigma_k) \quad (12)$$

When considering state estimation (corresponding to state estimation 212 of FIG. 2), according to the present embodiment, it uses Gaussian mixtures. The appropriate Bayes update equation is stated already in equation (5). To use mixtures of Gaussian probability density distributions appropriate probabilistic computation rules have to be provided. In [1] computation rules regarding linear combinations of mixture distributions such as the component by component parametric multiplication and reduction strategies for keeping the number of mixture components small are explained. The integral over the linear-Gaussian transition model is solved according to the present embodiment according to [7].

As regards the implementing and performing of the control policy (corresponding to policy entity 214 of FIG. 2), the formulation of the reward model is usually a very crucial issue as it has great influence on the robot behaviour and needs to be carefully investigated. Considering perception problems the quality of information is usually closely related to the probability density distribution over the state space. According to the present embodiment, the control policy is performed by updating the prior state distribution in a Bayes filter with new observations targets on reducing the uncertainty in the resulting posterior probability density distribution. For determining the information gain between two belief distributions, information theoretic measures such as the entropy $h_b(q)$ of a belief distribution are used according to the present embodiment. The expected information gain:

$$I_b(a) = h_b(q) - E_O[h_b(q'|O_t(a_t))] \quad (13)$$

is stated according to the present embodiment as the difference between the prior entropy and the expected entropy of the future belief. Adding the expected costs of the control action 'a' for achieving this belief leads according to the present embodiment to the modified reward model:

$$R_a(b) = -\alpha E_O[h_b(q'|O_t(a_t))] + \int r_a(b)b(q)dq. \quad (14)$$

The factor $\alpha$ relates both terms meaning it expresses the value of information in comparison to the costs of executing of the action 'a'.

The demand of continuous spaces entails a large number of action-observation combinations. The off-line determination of the reward is difficult as the great variety of possibilities cannot be considered a priori. For online computation, many combinations can be excluded, however, real-time constraints have to be met. In fact, observations usually change the belief distribution enormously and make the current action policy unfeasible. Hence a 1-horizon planning strategy can be more efficient for the considered scenarios which can be achieved by applying a Greedy-technique to plan an action sequence until a measurement or observation is performed:

$$R_a(b) = \begin{cases} \int r_a(b)b(q)dq & \text{if } t < T \\ \alpha h_b(q' \mid O_t(a_t)) & \text{if } t = T \end{cases} \quad (15)$$

According to the present embodiment, the iterative planning algorithm terminates when the desired quality criteria in form of distribution entropies is reached.

When performing entropy approximation, the computation of the differential entropy requires the estimation of the prospective state for a given action and an efficient methodology for its fast computation. Here, the following computations are performed according to the present embodiment.

1) State and observation prediction: The posterior distribution represents the influence of a measurement or observation, which follows an action, on the prior state distribution. To predict a belief distribution b(q) for a prospective action 'a' it is needed or required to estimate the observation or measurement $O_t(a_t)$ which will be obtained after executing a control action. By comparing the probability of the observation occurrence:

$$P(O_t(a_t)) = \int P(O_t(a_t)|q')p(q')dq'. \quad (16)$$

with a threshold, an expected observation or measurement can be derived and incorporated together with the current prior belief to obtain the posterior estimate. The threshold can be a predetermined threshold.

2) Differential entropy: The information theoretic concept for measuring the uncertainty of continuous probability distributions is the differential entropy:

$$h(q) = -\int p(q)\log p(q)dq. \quad (17)$$

Since the computation of the entropy both numerically or by sampling from parametric probability density distribution is costly in matters of processing time, the approximation of the differential entropy of a multivariate Gaussian mixture distribution by the upper bound estimate:

$$h_U(q) = \sum_{k=1}^{K} w_k \left[ -\log w_k + \frac{1}{2}\log((2\pi\exp)^D |\Sigma_k|) \right] \quad (18)$$

is used to determine the state uncertainty. D denotes the dimension of the state, $|\Sigma_k|$ denominates the determinant of the k-th component's covariance matrix. For details it is referred to [1].

In following, a test setup, including the specification models and object detection properties, is described. Two experiments demonstrate exemplary aspects according to two corresponding embodiments.

When considering model specifications of the experiments, for the sake of clarity, planar problems are assumed. In the embodiments describing the experiments, object poses are described in the three-dimensional real state space $R^3$, where two dimensions represent the translations and one dimension represents the angular component.

Figure 3A:
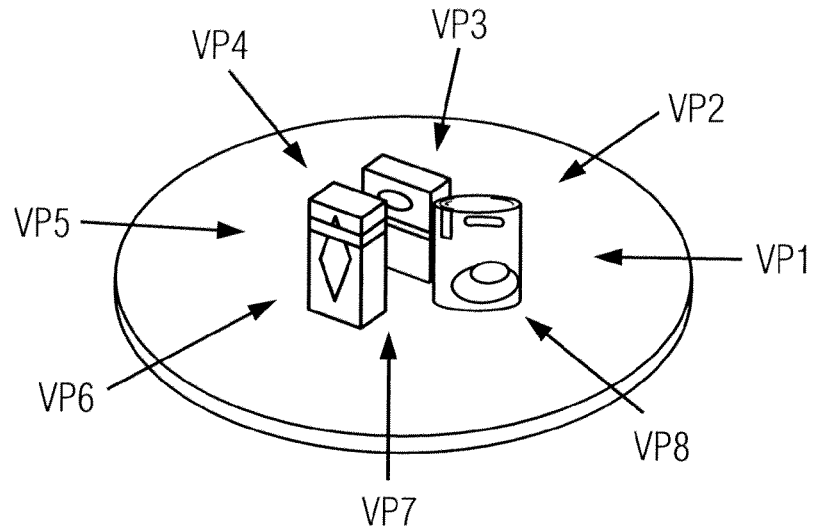
FIG. 3a shows an action space arranged according to an embodiment.

According to the embodiments describing the experiments, the action space A is set to a number of eight different control actions, wherein each of the actions is equal to a change in a viewpoint. The viewpoints VP1, VP2, VP3, VP4, VP5, VP6, VP7, and VP8, used in the embodiments describing the experiments, are illustrated in FIG. 3a. In FIG. 3, the viewpoints VP1, VP2, VP3, VP4, VP5, VP6, VP7, and VP8 are circularly aligned in steps of 45° at a radius of 1.2 meters.

For image acquisition, according to the present embodiments describing the experiments a stereo-camera system which is mounted on the service robot is used. Each of cameras of the stereo-camera system is configured to capture grey-scale images with a resolution of 1388×1038 pixels. Object detection is accomplished according to the present embodiments relating to the experiments by a detection algorithm based on SIFT features (see [18]). In an off-line process, 36 images of each object are taken in 10° longitudinal steps. This results in around 30000 acquired features for each object. The stereo camera system allows quite accurate pose determination as long as many features of an object are detected. According to the present embodiments relating to the experiments, weak object hypotheses with few features by adding probabilistic properties to the detection algorithm has been explicitly treated. In detail, the object class likelihood is calculated from the relation of seen features to expected features, the pose covariance is estimated from the number of detected features according to the present embodiments relating to the experiments.

Figure 3B:
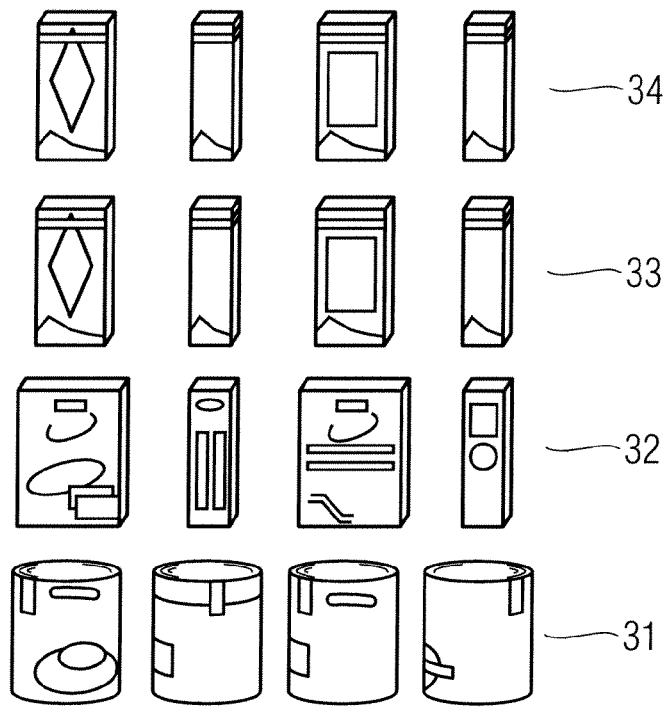
FIG. 3b shows an object data base of a state model arranged according to an embodiment.

FIG. 3b shows an object data base of a state model arranged according to the present embodiments relating to the experiments.

The used object database consists of four different objects 31-34, a sauerkraut can 31, a soup box 32, and two salt boxes 33, 34. FIG. 3b shows the database objects from different viewing angles. Evidently the salt boxes 33, 34 are very similar in their textures. As the SIFT detector works with interest points and not with colour information, their disambiguation might be difficult from some views.

Above, the use of mixtures of Gaussian for representing probability distributions has been described. According to the present embodiments relating to the experiments, the initial prior is modelled with four mixture components, each of them with a weight factor of 0.25 and each of them belonging to one object class. The co-variances are large in order to roughly approximate a uniform distribution representing the lacking initial knowledge about the state distribution. The transition uncertainty is defined according to the present embodiments relating to the experiments as the linear Gaussian:

$$p_a(q'|q) = \sum_{k=1}^{K} w_k N(q | \mu_k + \Delta(a), \sum_k (a)), \quad (19)$$

with Gaussian kernels equal in the number of components and mean values to the state distribution. $\Delta(a)$ indicates the change in state dependent on the action with a covariance $\Sigma_k(a)$. The measurement uncertainty is included in the feature likelihood distribution $P(f(a)|q')$ which is acquired in a training process by fitting a Gaussian mixture distribution into the field of visibility of a feature. The visibility volume is derived from the object views and the feature scales.

In order to determine the costs of the reward model, according to the present embodiments relating to the experiments, the robot movability has been restricted to a circular path and estimates the costs from the movement angle.

According to an embodiment concerning a first experiment, a localization process has been performed.

FIGS. 4a to 4c, 5a to 5c, 6a to 6c, and 7a to 7c show a sequence of posterior distributions based on chosen sensing actions forming or establishing the sequence. Here, the sequence is visualised by FIG. 4, FIG. 5, FIG. 6, and FIG. 7. FIGS. 4a, 5a, 6a, and 7a show the initial scenario, present for a corresponding action of the sequence, and observations performed for the corresponding action. FIGS. 4b, 5b, 6b, and 7b illustrate the contours of the belief distributions in xy-dimensions for the corresponding actions. Here, each contour belongs to one object class. FIGS. 4c, 5c, 6c, and 7c depict the angular distributions for each object class separately, wherein in each of the FIGS. 4c, 5c, 6c, and 7c the distribution of blue salt 34 is provided on the left side of the upper row, the distribution of soup box 32 is provided on the right side of the upper row, the distribution of sauerkraut can 31 is provided on the left side of the lower row, and the distribution of yellow salt 33 is provided on the right side of the lower row.

Figure 4A:
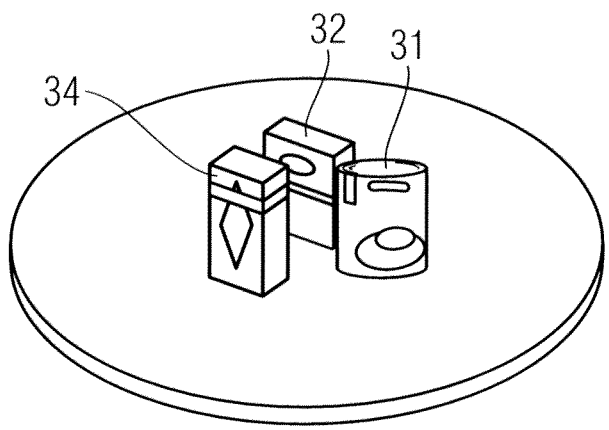
Figure 4B:
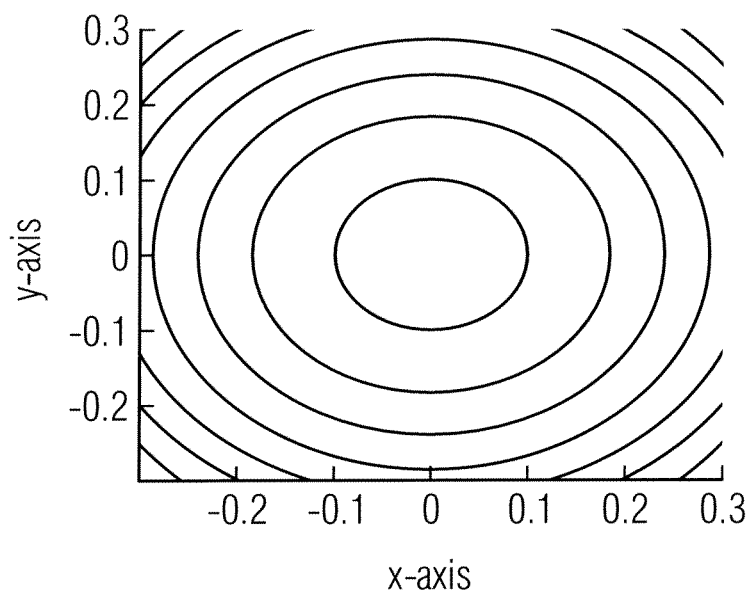
Figure 4C:
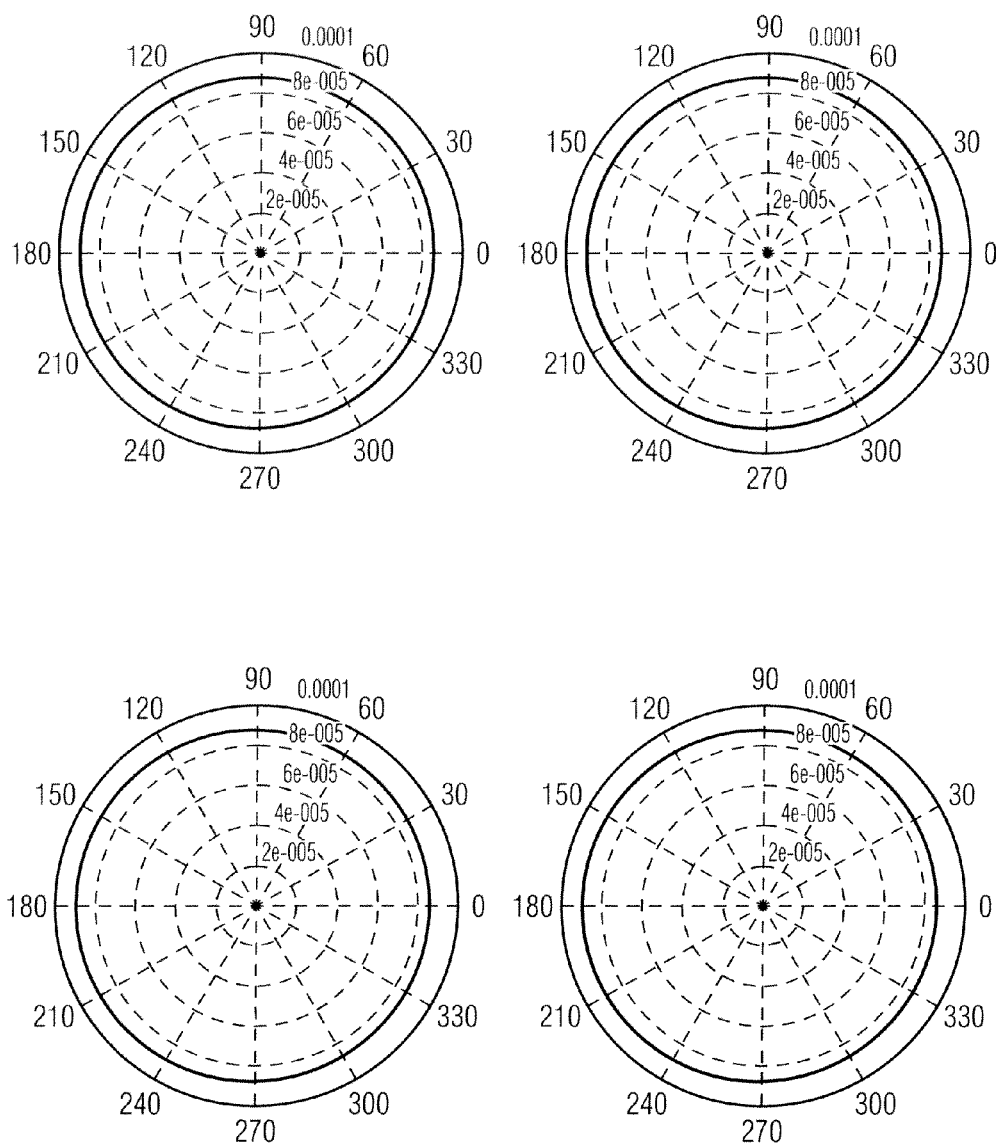
Figure 5A:
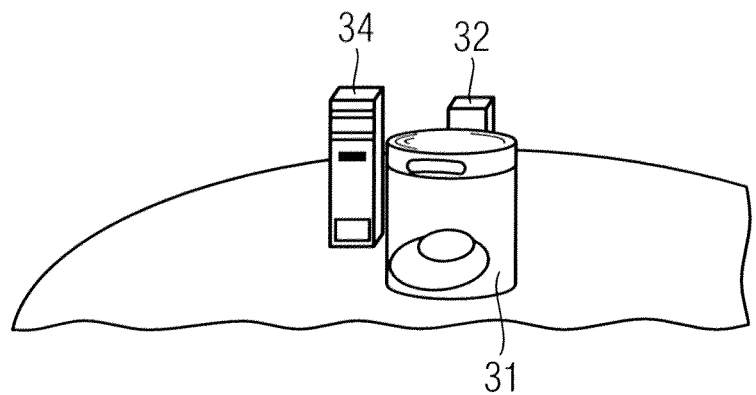
Figure 5B:
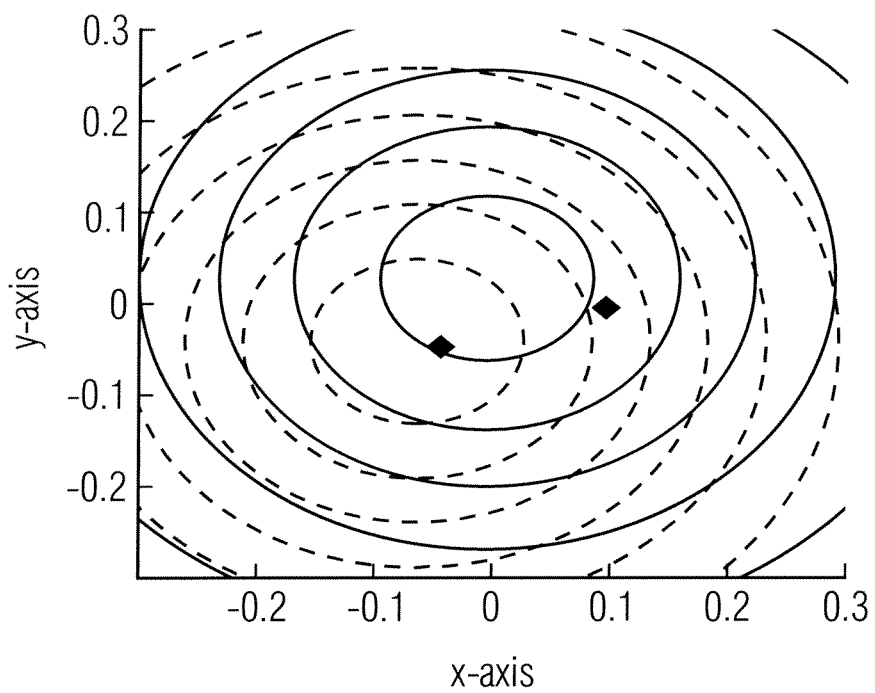
Figure 5C:
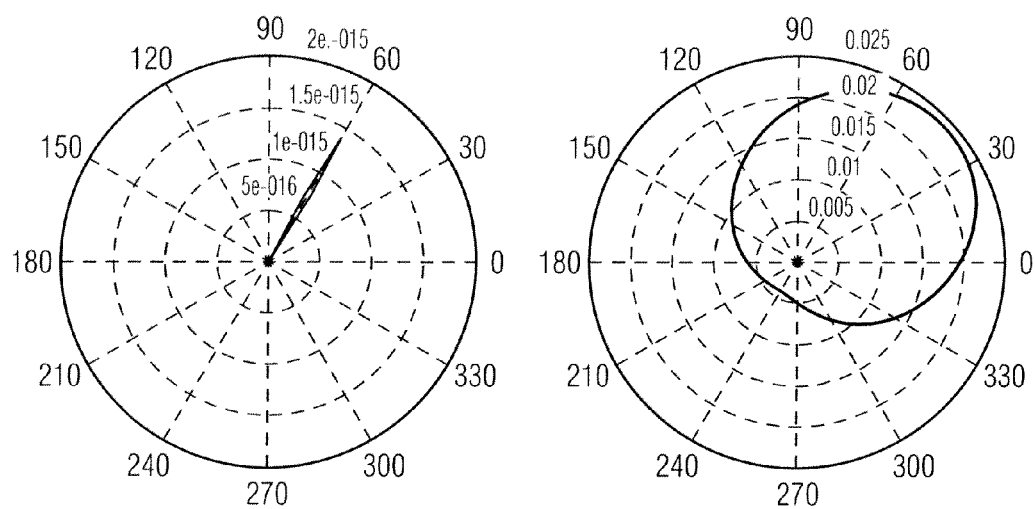
Figure 5C:
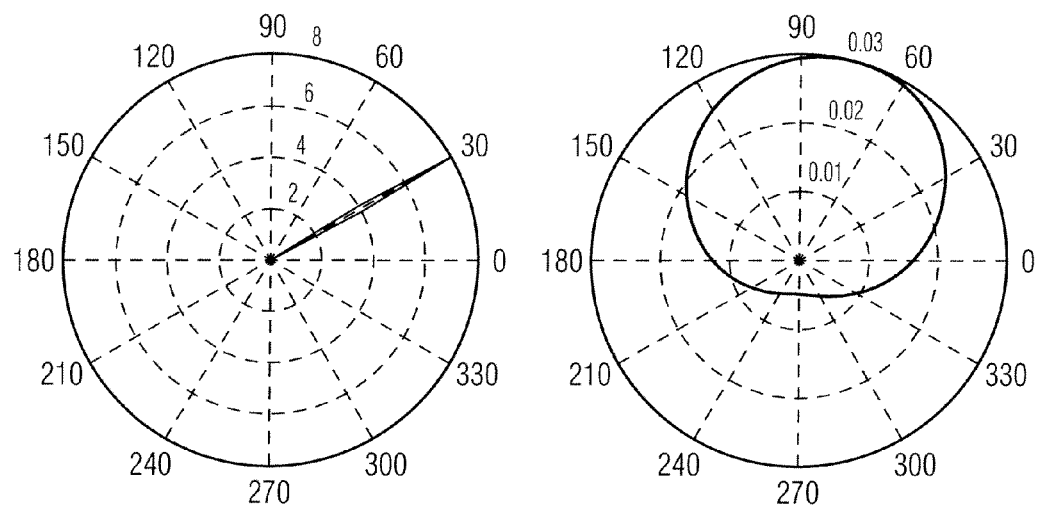
Figure 6A:
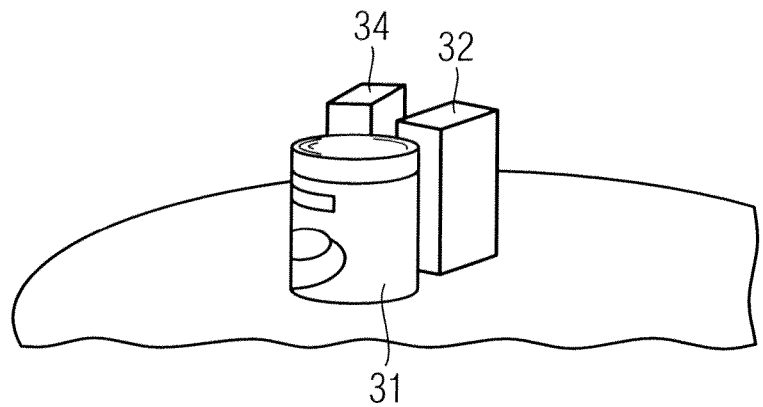
Figure 6B:
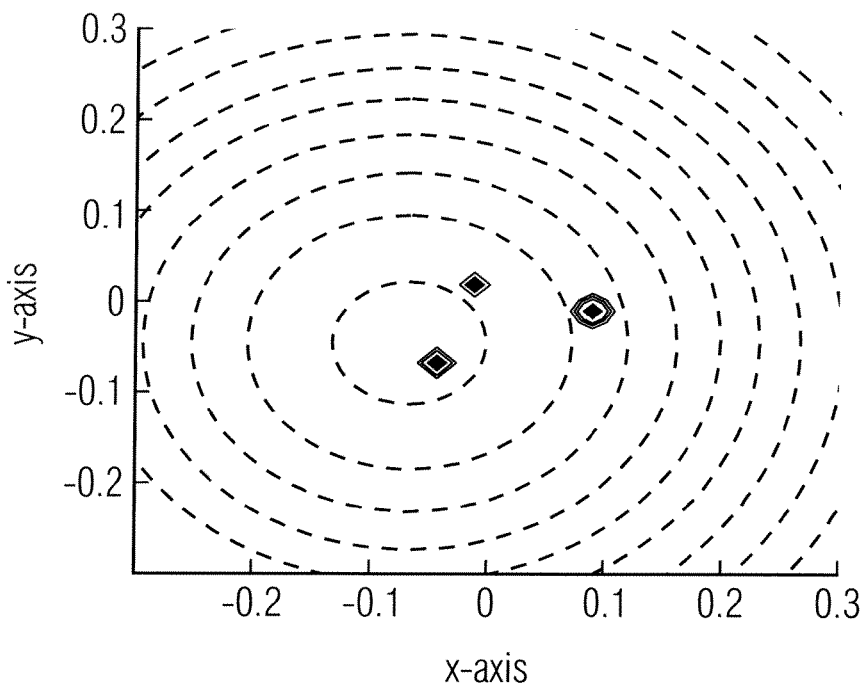
Figure 6C:
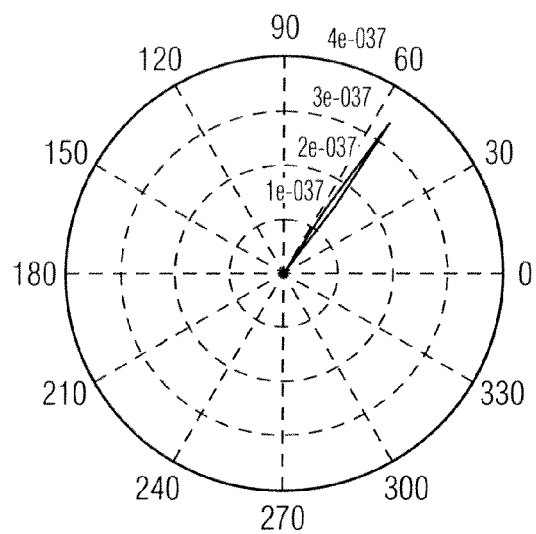
Figure 6C:
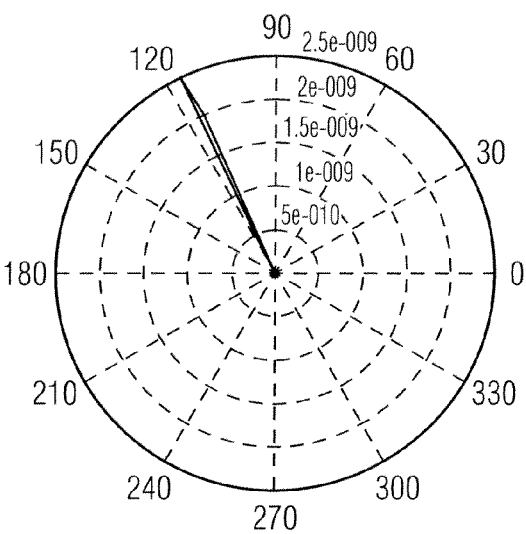
Figure 6C:
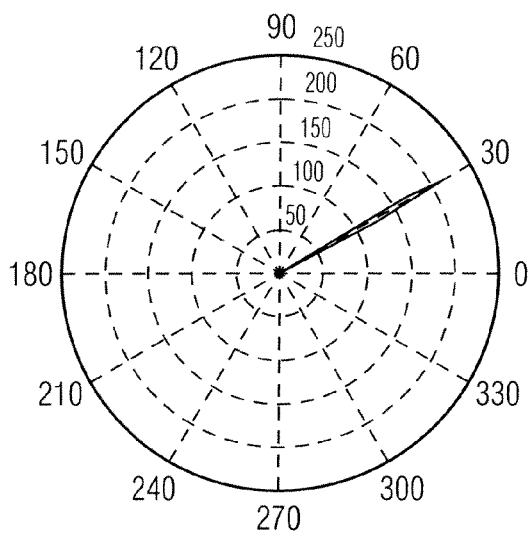
Figure 6C:
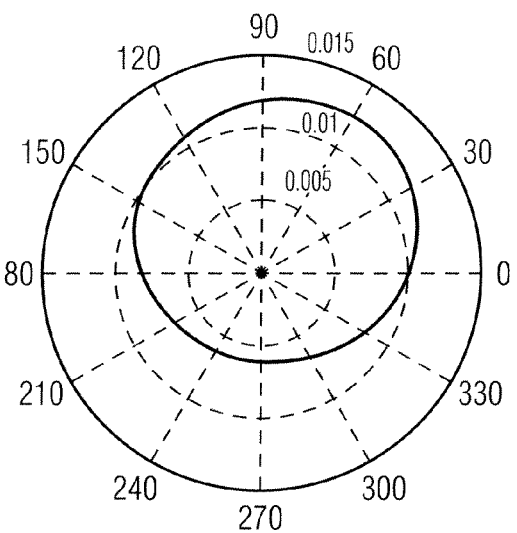
Figure 7A:
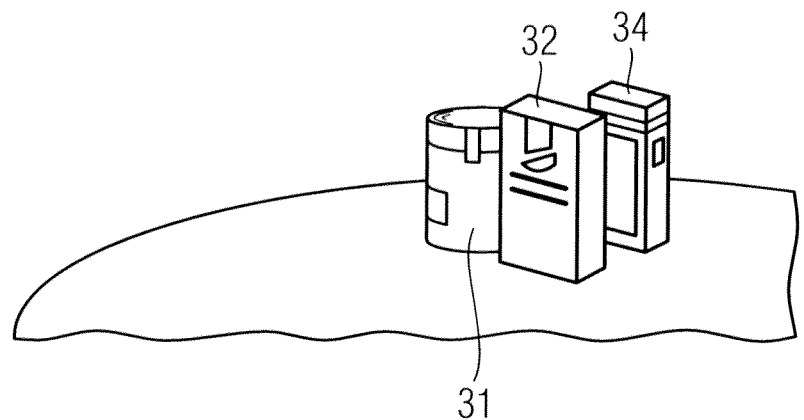
Figure 7B:
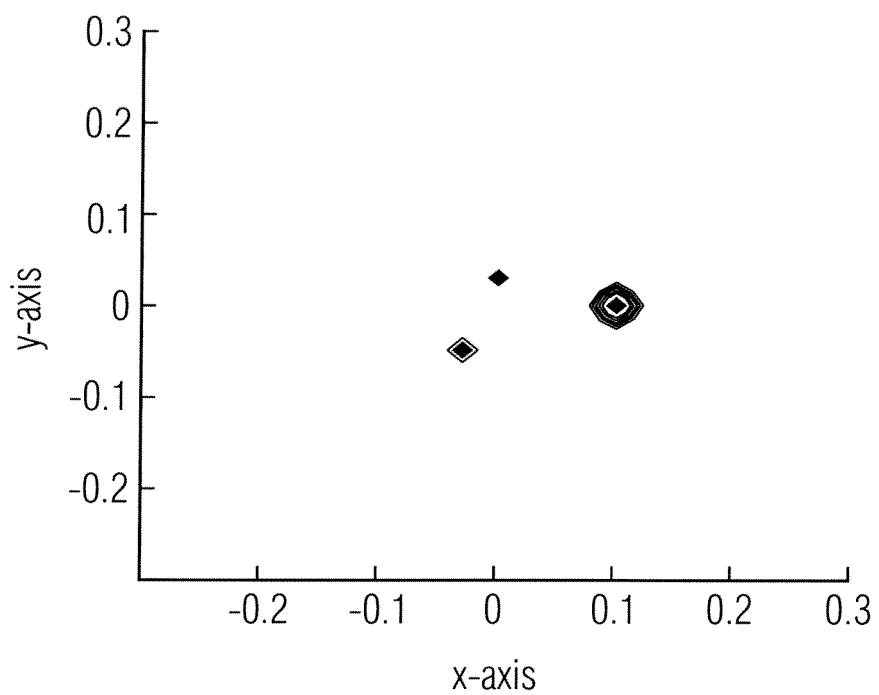
Figure 7C:
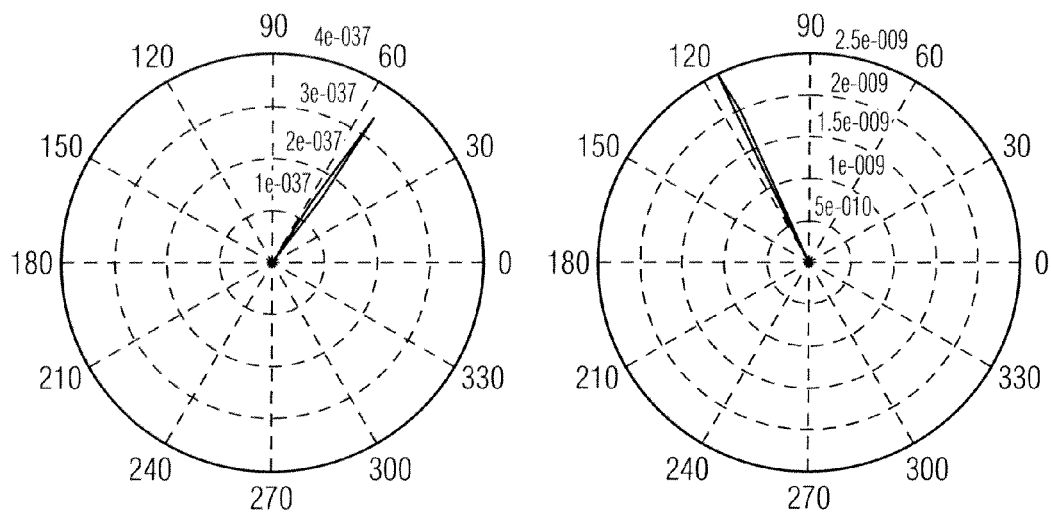
Figure 7C:
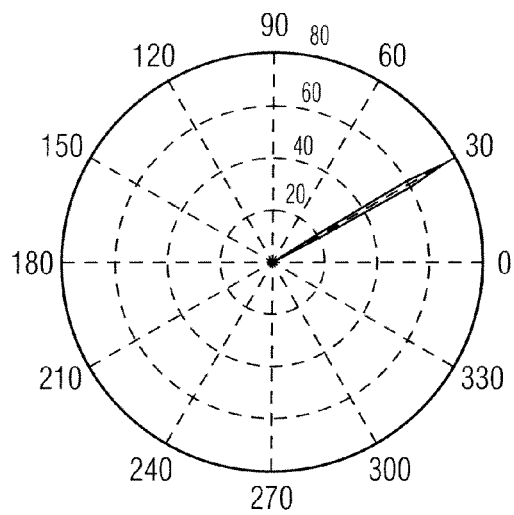

According to the present embodiment, in this first experiment an object constellation as illustrated in FIG. 4a is used. Here, the scene to be investigated or recognized by a robot comprises three objects 31, 32, 34 of the object data base of FIG. 3b. The initial posterior entropies for all actions are alike because of the approximately uniform prior. FIG. 4b shows contours of the probability distribution of all four objects 31 to 34 of the object data base of FIG. 3b in xy-dimension integrated over the angle. FIG. 4c represents the corresponding angular probability distributions integrated over the other dimensions. According to equation (14) the action costs only influence the selection of action in the first step. Thus, the first observation is performed from the current sensor location, namely the first viewpoint VP1 shown in FIG. 3a. In FIG. 5a, the acquired image of the left camera and its resulting probability distributions are shown. As it can be seen from FIG. 5b and FIG. 5c, the sauerkraut can 31 and the blue salt box 34 are detected successfully, but there is only a weak hypothesis for the soup box 32 as it is highly occluded. Due to object ambiguities a hypothesis for the yellow salt box 33 is stated close to the one from the blue salt but containing less probability mass. The table of FIG. 8 lists the expected rewards $V_1$ used for deciding on which action to perform next. In particular, FIG. 8 shows correlating costs and value for calculating the reward $V_1$ from equation (14) for estimations at the viewpoints VP1 and VP2. Here, column 81 indicates the viewpoints, column 82 indicates the expected feature reward at viewpoint VP1. Further, column 83 indicates corresponding costs at viewpoint VP1, column 84 indicates the VP1 value, and column 85 indicates the reward $V_1$ at viewpoint VP1. Moreover, column 86 indicates corresponding costs at viewpoint VP2, column 87 indicates the VP2 value, and column 88 indicates the reward $V_1$ at viewpoint VP2.

According to the present embodiment, the current viewpoint is not considered in the selection process. In the following step, the robot moves to the second viewpoint VP2 (as shown in FIG. 3a) and sharpens the belief distribution by observing the soup box 32. This situation is pointed out by FIGS. 6a, 6b, and 6c. The next decision is more challenging (see FIGS. 7a, 7b, and 7c). While the way-off seventh viewpoint VP7 (as shown in FIG. 3a) seems to be the best option in order to increase the system knowledge, the fourth viewpoint VP4 (as shown in FIG. 3a) is chosen because of the best cost-value relation. The easier reachable third viewpoint VP3 (as shown in FIG. 3a) is avoided due the estimated occlusion of the salt boxes. Finally, the last measurement eliminates the yellow salt box 33 hypothesis from the state space, so that the three existent objects (sauerkraut can 31, soup box 32, and blue salt box 34) are located by the robot according to the present embodiment.

The second experiment performed to a further embodiment corresponds to varied parameters. In this experiment the relation between costs and benefits and the use of occlusion detection are discussed within the same scenario. Starting again from the first viewpoint VP1 as shown in FIG. 3a different action plans are executed. Table provided in FIG. 9 compares the chosen policies depending on an adapted correlation factor $\alpha_n$. Without considering occlusions, the executed actions toggle between two viewpoints as their expected information gain is very high, since the hidden objects are also regarded in state prediction. The algorithm or method still terminates in this case, however with the state space containing only two hypotheses. In particular, in the table of FIG. 9 varying dependencies on a new $\alpha_n$ correlation coefficient with respect to the previous $\alpha$ are shown. In FIG. 9, column 91 refers to various $\alpha_n$, column 92 refers to occlusion detection, and column 93 refers to no occlusion consideration.

Various embodiments present or provide the integration of a sequential decision making component realized as a POMDP in an active perception module for robotic real world applications. The proposed approach is embedded in a fully probabilistic framework and is suited for continuous and high-dimensional domains due to the consequent use of parametric representation. According to the embodiments presented above, a simple z-buffering method has been used in order to solve the occlusion problem. According to a further embodiment a probabilistic representation of occlusions, which is more appropriate and fits the overall probabilistic approach, can be made. According to another embodiment, an improvement towards the applicability in real world scenarios can be achieved by automatically learning or adapting the task dependent parameter $\alpha$ of the control policy.

In view of the above description, the following can be provided.

In active perception systems for scene recognition, the utility of an observation is determined by the information gain in the probability distribution over the state space. The goal is to find a sequence of actions which maximizes the system knowledge at low resource costs. Most current approaches focus either on optimizing the determination of the payoff neglecting the costs or develop sophisticated planning strategies for simple reward models.

According to various embodiments, a probabilistic framework is presented which provides an approach for sequential decision making under model and state uncertainties in continuous and high-dimensional domains. The probabilistic planner, realized as a partially observable Markov decision process (POMDP), reasons by considering both, information theoretic quality criteria of probability distributions and control action costs.

In an experimental setting an autonomous service robot uses active perception techniques for efficient object recognition in complex multi-object scenarios, facing the difficulties of object occlusion. Due to the high demand on real time applicability the probability distributions are represented by mixtures of Gaussian to allow fast, parametric computation.

Various embodiments use POMDP and extend POMDP for planning of actions. To determine the benefit of a possible future or prospective action, an estimated uncertainty is determined after simulating of the action and evaluated with information theoretic measures like entropy, for example. Costs of an action are composed of or consist of feasibility of the action and costs for executing or performing the action. By use of a parameter quality criterions of factors are set in relation. Uncertainties, which arise from inaccuracy of measures and/or of performance or executing of actions, are represented by mixtures of Gaussian.

According to various embodiments, applying of estimates of high-dimensional probability distributions as mixtures of Gaussian and comparing of various quality criterions of factors resulting amongst others from probability distributions are used.

In this way, various embodiments provide the advantages of reduction of resources required, fast and efficient methodology, and effective and efficient planning of actions by use of current knowledge for predicting of results, measures or observations of actions.

Thus, various embodiments refer to a decision mechanism or decision making component, configured to decide on at least one prospective action of a robot from a set of actions by: computing a prior probabilistic representation of a prior environment state; updating said prior probabilistic representation with targets of a new observation on reducing at least one uncertainty in a posterior probabilistic representation of a posterior environment state to be reached after an appliance of said at least one prospective action, said posterior probabilistic representation resulting from said updating; determining an information gain between said prior probabilistic representation and said posterior probabilistic representation by use of at least one information theoretic measure; evaluating said at least one prospective action by adding costs of executing said at least one prospective action to said information gain. Various embodiments provide an improved action planning for robots and can be implemented in various robots performing and/or requiring investigating of scenes or environments for their actions.

While various embodiments and applications have been shown and described above, it should be apparent to those skilled in the art, that many more modifications (than mentioned above) are possible without departing from the inventive concept described herein. The invention, therefore, is not restricted except in the spirit of the appending claims. Therefore, it is intended that the foregoing detailed description should be regarded as illustrative rather than limiting.

LIST OF CITED DOCUMENTS

[1] R. Eidenberger, T. Grundmann, W. Feiten, and R. Zoellner, "Fast parametric viewpoint estimation for active object detection," in Proceedings of the IEEE International Conference on Multisensor Fusion and Integration for Intelligent Systems, 2008.

[2] M. Chli and A. J. Davison, "Active matching," in European Conference on Computer Vision, 2008.

[3] J. Vogel and N. de Freitas, "Target-directed attention: sequential decision-making for gaze planning," in International Conference on Robotics and Automation, 2008.

[4] N. Roy, G. Gordon, and S. Thrun, "Finding approximate pomdp solutions through belief compression," Journal of Artificial Intelligence Research, vol. 23, pp. 1-40, 2005.

[5] M. Duff, "Optimal learning: Computational procedures for bayesadaptive markov decision processes," Ph.D. dissertation, Massachusetts Amherst, 2002.

[6] J. M. Porta, M. T. J. Spaan, and N. Vlassis, "Robot planning in partially observable continuous domains," Robotics: Science and Systems, p. 217224, 2005.

[7] J. M. Porta, N. Vlassis, M. T. Spaan, and P. Poupart, "Point-based value iteration for continuous pomdps," Journal of Machine Learning Research, vol. 7, pp. 2329-2367, 2006.

[8] S. Ross, J. Pineau, S. Paquet, and B. Chaib-draa, "Online planning algorithms for pomdps," Journal of Artificial Intelligence Research, vol. 32, pp. 663-704, 2008.

[9] S. Paquet, B. Chaib-draa, and S. Ross, "Hybrid pomdp algorithms," in Workshop on Multi-Agent Sequential Decision Making in Uncertain Domains, 2006, pp. 133-147.

[10] S. Yoon, A. Fern, R. Givan, and S. Kambhampati, "Probabilistic planning via determinization in hindsight," in AAAI Conference on Artificial Intelligence, 2008.

[11] A. Guo, "Decision-theoretic active sensing for autonomous agents," in Proceedings of the 2nd International Joint Conference on Autonomous Agents and Multi-Agent Systems, 2003.

[12] S. Ji and L. Carin, "Cost-sensitive feature acquisition and classification," Pattern Recognition, vol. 40, pp. 1474-1485, 2007.

[13] M. T. J. Spaan, "Cooperative active perception using POMDPs," in AAAI 2008 Workshop on Advancements in POMDP Solvers, 2008.

[18] D. G. Lowe, "Object recognition from local scale-invariant features," in International Conference on Computer Vision, 1999, pp. 1150-1157.

What is claimed is:

1. A decision making mechanism of an active perception module of a robot, the active perception module including at least one processing unit executing one or more instructions from a non-transitory machine-readable medium, said decision making mechanism being operable to decide on at least one prospective action of a robot from a set of actions of said robot by:

the active perception module computing a prior probabilistic representation of a prior environment state;

the active perception module updating of said prior probabilistic representation with targets of a new observation following the at least one prospective action after an action period, the action period comprising a period for incorporating an action observation pair into an update of an environment state, thereby reducing at least one uncertainty in a posterior probabilistic representation of a posterior environment state to be reached after an appliance of said at least one prospective action, wherein said posterior probabilistic representation is a probabilistic representation resulting from said updating;

the active perception module determining an information gain between said prior probabilistic representation and said posterior probabilistic representation by use of at least one information theoretic measure; and the active perception module evaluating said at least one prospective action by estimating the costs of executing said at least one prospective action during the action period and estimating said information gain at the end of the action period.

2. The decision making mechanism according to claim 1, wherein said at least one prospective action is an action to be executed by said robot.

3. The decision making mechanism according to claim 1, wherein said at least one prospective action is a robot actuation command demanding a change of position of a sensor of said robot.

4. The decision making mechanism according to claim 1, wherein said decision making mechanism is configured to evaluate a sequence of prospective actions of said robot.

5. The decision making mechanism according to claim 1, wherein said at least one uncertainty comprises at least one of:
a state transition uncertainty arising when reaching said posterior environment state from the prior environment state by said appliance of said at least one prospective action; and
a measurement noise disturbing a measurement performed at said posterior environment state.

6. The decision making mechanism according to claim 1, wherein said decision making mechanism is configured to perform said updating in a Bayes filter.

7. The decision making mechanism according to claim 1, wherein said at least one information theoretic measure is entropy on a probabilistic representation.

8. The decision making mechanism according to claim 1, wherein said determining comprises determining of a difference between a prior entropy of said prior probabilistic representation and a expected entropy of said posterior probabilistic representation.

9. The decision making mechanism according to claim 1, wherein said updating comprises an estimating of the new observation, which will be obtained after executing of said at least one prospective action.

10. The decision making mechanism according to claim 9, wherein said updating comprises predicting of said posterior probabilistic representation of said posterior environment state for said at least one prospective action by use of said estimating.

11. The decision making mechanism according to claim 1, wherein of said prior probabilistic representation and said posterior probabilistic representation are multivariate Gaussian mixture distributions.

12. The decision making mechanism according to claim 1, wherein said at least one uncertainty is a state uncertainty determined by approximating differential entropy of said posterior probabilistic representation by an upper-bound estimate.

13. The decision making mechanism according to claim 1, wherein said decision making mechanism is configured to decide on said at least one prospective action if, after executing of said at least one prospective action, said information gain is maximized and said costs of executing said at least one prospective action and said uncertainty are reduced.

14. The decision making mechanism according to claim 1, wherein the decision making mechanism is configured to terminate said deciding if a desired quality criteria is reached.

15. The decision making mechanism according to claim 13, wherein said desired quality criteria is provided in form of at least one distribution entropy.

16. The decision making mechanism according to claim 1, wherein said prior probabilistic representation and said posterior probabilistic representation are computed by use of a model specified by use of a POMDP concept.

17. The decision making mechanism according to claim 1, wherein said prior environment state and said posterior environment state describe a state of at least one object, wherein said state of at least one object contains a discrete class representation of a class of said at least one object and a continuous m-dimensional pose of said at least one object.

18. The decision making mechanism according to claim 1, wherein said prior environment state and said posterior environment state refer to a state of a scene comprising at least one object located in said scene and determine visibility of features said at least one object in said state.

19. The decision making mechanism according to claim 1, wherein said new observation is expressed as a detection of a set of features of at least one object of a scene.

20. The decision making mechanism according to claim 1, wherein said decision making mechanism is implemented in said robot.

21. The decision making mechanism according to claim 1, wherein said decision making mechanism is implemented in an active perception module of said robot, said active perception module being configured to autonomously investigate scenes.

22. A method for deciding on at least one prospective action of a robot from a set of actions of said robot, the method comprising:
computing, via an active perception module of said robot, the active perception module including at least one processing unit executing one or more instructions from a non-transitory machine-readable medium for performing the computing, a prior probabilistic representation of a prior environment state;
updating, via said active perception module, of said prior probabilistic representation with targets of a new observation following the prospective action after an action period, the action period comprising a period incorporating an observation action pair into an update of a prior environment state, thereby reducing at least one uncertainty in a posterior probabilistic representation of a posterior environment state to be reached after an appliance of said at least one prospective action, wherein said posterior probabilistic representation is a probabilistic representation resulting from said updating;
determining, via said active perception module, an information gain between said prior probabilistic representation and said posterior probabilistic representation by use of at least one information theoretic measure; and
evaluating, via said active perception module, said at least one prospective action by estimating the costs of executing said at least one prospective action of the robot during the action period and estimating said information gain at the end of the action period.

23. An active perception module comprising a decision making mechanism according to claim 1, wherein said active perception module is configured to autonomously investigate scenes.

24. The active perception module according to claim 23, wherein said active perception module is implemented in a robot.

25. A robot comprising a decision making mechanism according to claim 1, wherein said robot is configured to autonomously investigate scenes.

26. A robot comprising an active perception module according to claim 23, wherein said robot is configured to autonomously investigate scenes.

* * * * *